US010915976B1

(12) United States Patent
Park et al.

(10) Patent No.: US 10,915,976 B1
(45) Date of Patent: Feb. 9, 2021

(54) HOME SELECTION AND DISPLAY

(71) Applicant: Wells Fargo Bank, N.A., San Francisco, CA (US)

(72) Inventors: Edward B. Park, San Francisco, CA (US); Carolyn J. Thomas, San Francisco, CA (US); Darren James Dobier, Stillwater, MN (US); Cory Elkin, Galveston, TX (US); Teresa Garcia, Waukee, IA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 472 days.

(21) Appl. No.: 15/351,938

(22) Filed: Nov. 15, 2016

(51) Int. Cl.
| G06Q 50/16 | (2012.01) |
| G01C 21/36 | (2006.01) |
| G06Q 30/06 | (2012.01) |
| G06Q 40/02 | (2012.01) |

(52) U.S. Cl.
CPC ......... *G06Q 50/16* (2013.01); *G01C 21/3644* (2013.01); *G06Q 30/0643* (2013.01); *G06Q 40/025* (2013.01)

(58) Field of Classification Search
USPC ........................................................ 705/313
See application file for complete search history.

(56) References Cited

U.S. PATENT DOCUMENTS

| 6,785,676 B2 | 8/2004 | Oblinger |
| 7,333,943 B1 | 2/2008 | Charuk et al. |
| 7,664,801 B2 | 2/2010 | Walker |
| 8,051,089 B2 | 11/2011 | Gargi et al. |
| 8,103,597 B2 | 1/2012 | Arnebeck |
| 8,166,410 B2 | 4/2012 | Tadman et al. |
| 8,527,528 B2 | 9/2013 | Binder |
| 8,627,222 B2 | 1/2014 | Hartwell et al. |
| 8,688,594 B2 | 4/2014 | Thomas et al. |
| 8,844,811 B1 | 9/2014 | Rogers et al. |
| 8,941,465 B2 | 1/2015 | Pineau et al. |
| 8,990,889 B2 | 3/2015 | Van Till et al. |
| 9,104,782 B2 | 8/2015 | Visioli et al. |
| 9,141,640 B2 | 9/2015 | Tadman et al. |
| 9,158,836 B2 | 10/2015 | Chitiveli et al. |
| 9,158,946 B2 | 10/2015 | Amdahl et al. |
| 2002/0022980 A1 | 2/2002 | Mozayeny et al. |
| 2002/0046077 A1 | 4/2002 | Mozayeny et al. |
| 2002/0052814 A1 | 5/2002 | Ketterer |

(Continued)

FOREIGN PATENT DOCUMENTS

WO          WO 01/37124 A2      5/2001

OTHER PUBLICATIONS

Kao et al., "Physical Access Control Based on QR Code," 2011 International Conference on Cyber-Enabled Distributed Computing and Knowledge Discovery, pp. 285-288 (2011).

(Continued)

*Primary Examiner* — Andrew B Whitaker
(74) *Attorney, Agent, or Firm* — Merchant & Gould P.C.

(57) ABSTRACT

A home analysis and display system and process includes receiving first data regarding home criteria. A pool of homes is assembled based on the first data, which includes a plurality of properties. The pool of homes is displayed, and a route for viewing the properties is determined. Feedback regarding the properties is received, and the pool of homes and/or the route is modified based on the received feedback.

10 Claims, 9 Drawing Sheets

(56) References Cited

U.S. PATENT DOCUMENTS

| | | | |
|---|---|---|---|
| 2004/0128215 A1* | 7/2004 | Florance | G06Q 30/06 705/28 |
| 2006/0080114 A1 | 4/2006 | Bakes et al. | |
| 2006/0106625 A1 | 5/2006 | Brown | |
| 2007/0156758 A1 | 7/2007 | Adiga | |
| 2008/0109433 A1 | 5/2008 | Rose | |
| 2008/0120289 A1 | 5/2008 | Golan et al. | |
| 2008/0168369 A1* | 7/2008 | Tadman | G01C 21/343 715/764 |
| 2009/0030707 A1 | 1/2009 | Green | |
| 2009/0319512 A1 | 12/2009 | Baker et al. | |
| 2010/0070989 A1 | 3/2010 | Lev | |
| 2010/0094548 A1* | 4/2010 | Tadman | G06Q 50/16 701/533 |
| 2011/0258101 A1* | 10/2011 | Albertelli | G06Q 50/16 705/37 |
| 2012/0246024 A1* | 9/2012 | Thomas | G06Q 50/16 705/26.41 |
| 2012/0290203 A1* | 11/2012 | King | G01C 21/343 701/430 |
| 2013/0131977 A1* | 5/2013 | Dickson | G01C 21/3676 701/428 |
| 2013/0151425 A1 | 6/2013 | Feinstein | |
| 2013/0268193 A1* | 10/2013 | Kritt | G01C 21/00 701/533 |
| 2014/0236350 A1 | 8/2014 | Woodard et al. | |
| 2014/0375422 A1 | 12/2014 | Huber et al. | |
| 2015/0228133 A1 | 8/2015 | Capaldi-Tallon | |

OTHER PUBLICATIONS

News Release, "Realtor.com(R) Launches Real Estate Search iPhone Application," 4 pages (Jan. 13, 2010).

Route4Me Route Planner, 3 pages Route4Me Inc., https://web.archive.org/web/20160827200556/https:/itunes.apple.com/us/app/route4me-route-planner/id349853799?mt=8 (Updated May 23, 2016).

* cited by examiner

HOME SELECTION AND DISPLAY

BACKGROUND

Buying a home is often one of the biggest financial transactions in a person's life. Finding a home that meets all of a buyer's needs and wants can be very complicated and time consuming. Moreover, time available for searching out and viewing available homes for sale is often limited. Thus, finding a home that meets a buyer's requirements can be a daunting task.

Existing tools to assist home buyers include, for example, web-based desktop and mobile applications. Various web sites allow searching of for-sale homes along with the seller's asking price. Buyers often also work with a real estate agent to assist them with finding, viewing, and purchasing a home.

SUMMARY

In accordance with certain aspects of the present disclosure, a system for assisting a potential home buyer by selecting and displaying various properties includes a computing system configured to receive first data regarding home criteria. The system assembles a pool of homes based on the first data, which includes a plurality of properties. The pool of homes is displayed for the buyer on user interface, which may be displayed on a tablet device, smart phone, or any suitable computing device. The system further may determine a route for viewing the properties of the pool of homes. In some embodiments, the pool of homes and route are displayed on a map for the buyer. The system receives feedback regarding the properties via the user interface, modifies the pool of homes and/or the route based on the received feedback.

DETAILED DESCRIPTION

In the following Detailed Description, reference is made to the accompanying drawings, which form a part hereof, and in which is shown by way of illustration specific embodiments in which the invention may be practiced. The following detailed description, therefore, is not to be taken in a limiting sense.

Buying a home is often one of the biggest financial transactions in a person's life. Finding the home that meets the buyer's needs is difficult and time consuming, yet time is often limited for the home buying process. Moreover, financial transactions associated with home buying such as home loans or home refinances are often complex. Professionals such as real estate agents and financial advisors are available to assist with home buying and financing, though this can add to the cost and complexity of the process. For example, the agents' schedules need to be coordinated with busy schedules of the buyers. And, some buyers simply prefer not to involve additional individuals in their personal home buying process.

Some aspects of the present disclosure provide, in effect, a virtual or automated real estate agent to assist with the process of purchasing a home, such as finding homes for sale, scheduling and facilitating viewing homes, providing financing, etc. For example, home criteria for a potential buyer are used to assemble a pool of homes listing homes for sale. The pool of homes is displayed for the potential buyer on a user interface of a computer or mobile device. A route for viewing the various for-sale houses making up the pool of homes is determined for the user to expediently view the homes. The buyer may provide feedback regarding the displayed homes via the user interface, and based on the feedback, the pool of homes may be modified. For instance, the information provided via the buyer's feedback may be used to delete unsuitable homes from the pool of homes, and/or add additional homes for sale to the pool of homes. Additionally, the home-viewing route may be modified based on the feedback to insure that the potential buyer views homes that best meet his or her needs.

Figure 1:
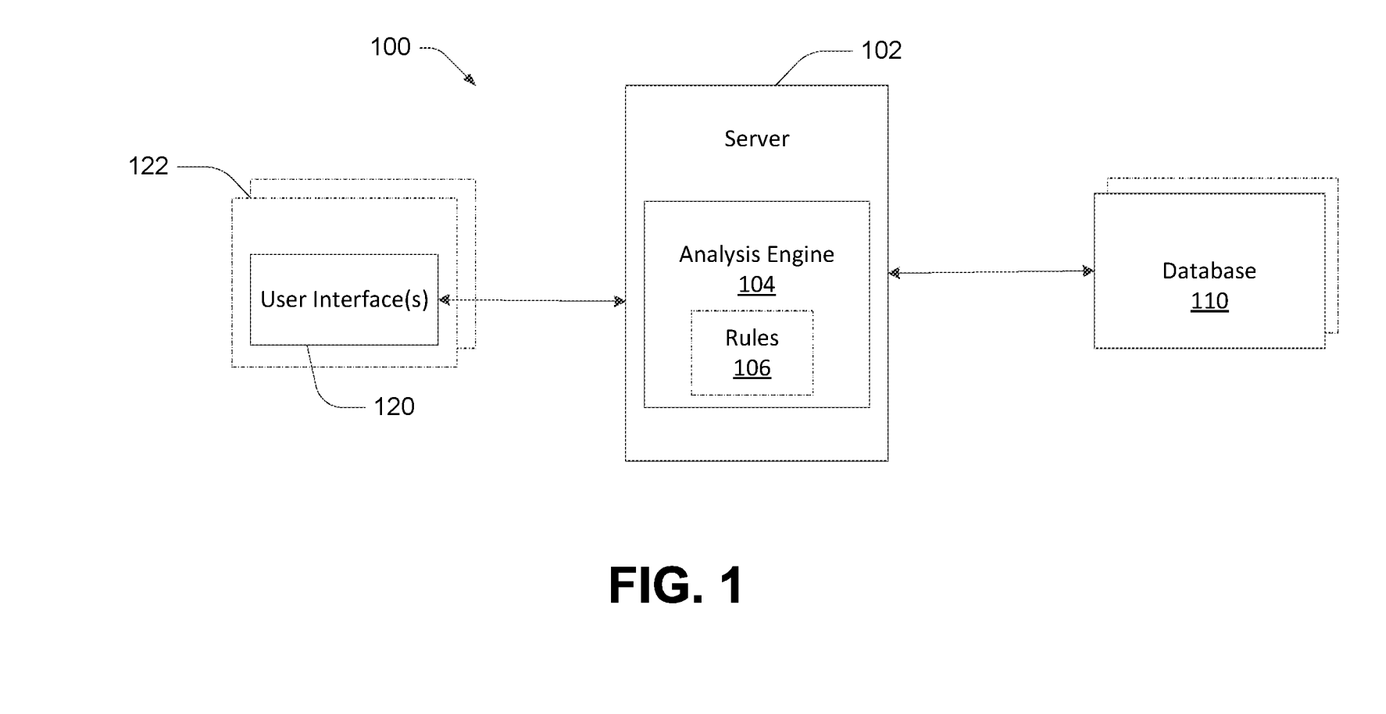
FIG. 1 is a block diagram illustrating an example of a home analysis and display system in accordance with aspects of the present disclosure.

FIG. 1 is a block diagram illustrating an example system 100 that includes a computing system such as a computer 102 implementing an analysis engine 104. In some examples, the computing system 102 is a server computer at a financial institution such as a bank, brokerage firm, mortgage company, etc. Other examples of financial institutions are possible. Further, the server 102 may be implemented by one or more computer systems. One or more databases 110 are accessible by the server 102. For example, the databases 110 may include one or more databases associated with the financial institution computer 102, storing information, for example, regarding internal customer accounts, as well as information regarding properties owned or controlled by the financial institution. Other databases 110 may include one or more external databases storing information external to the financial institution. Thus, the database 110 could be a local component of the server 102, though not necessarily located in close physical proximity to the server 102. For example, the database 110 could be accessible by the server 102 over local or wide area business networks or over other networks such as the internet.

One or more user interfaces 120 are configured to display and receive information from a user, such as a potential home buyer. The user interface 120 could be implemented on a user computer 122, which could be any of a number of suitable devices such as a desktop computer, laptop computer, tablet device, smart phone, etc. that communicates with the server 102, for example, via a network such as the internet. In general, the computer 102 is operable to receive information from the databases 110, as well as from the potential buyer via the user interface 120. The analysis engine further includes a rules engine 106 implemented by the computer 102, that applies predetermined rules to the gathered data to assist the potential buyer in the home buying process.

Figure 2:
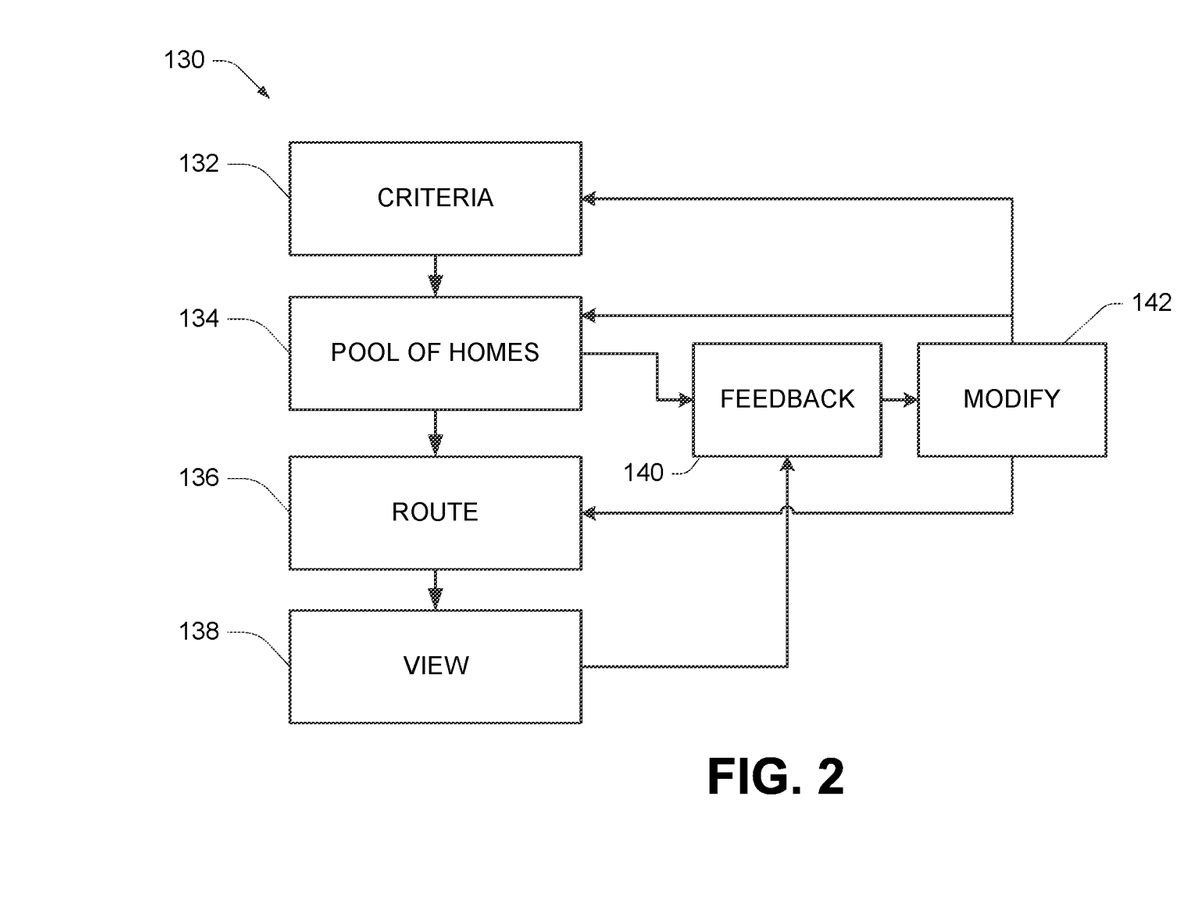
FIG. 2 is a flow diagram illustrating an example of a house analysis and display process in accordance with aspects of the present disclosure.

FIG. 2 generally illustrates an example of a process 130 implemented by the analysis engine 104 of the computer 102. In block 132, criteria regarding desired homes are received. As will be discussed further herein below, the criteria 132 may come from a variety of sources, including from the potential buyer. The criteria are applied to the rules engine 106 shown in FIG. 1 to assemble a pool of homes in block 134 based on the criteria received in block 132. More specifically, the pool of homes includes homes for sale assembled in accordance with the criteria, which may then be displayed on the user interface 120. In block 136, the analysis engine determines a route for viewing the homes included in the pool of homes. The rules engine 106 may be configured to apply any of several factors to determine the route. In addition to typical geographic and scheduling factors, the criteria 132 and their relative importance to the buyer are considered in some implementations when determining the route. The determined route is displayed for the buyer, such as on the user interface 120, and as shown block 138, the potential buyer views the homes.

At various points during the process 130, feedback is provided as shown in block 140. The feedback may be provided via the user interface 120. In various embodiments, one or more items generated by the analysis engine 104, are modified based on the feedback as shown in block 142. For example, the content of the pool of homes generated in block 134 may be modified based on feedback from the buyer based on the buyer's reaction to viewing the homes in block 138, or based on the buyer's review of the listing of homes displayed on the user interface. The route generated in block 136 may be modified based on the feedback 140, whether or not the pool of homes is modified. Even the criteria 132 used to generate the pool of homes 134 could be modified based on received feedback 140.

Figure 3:
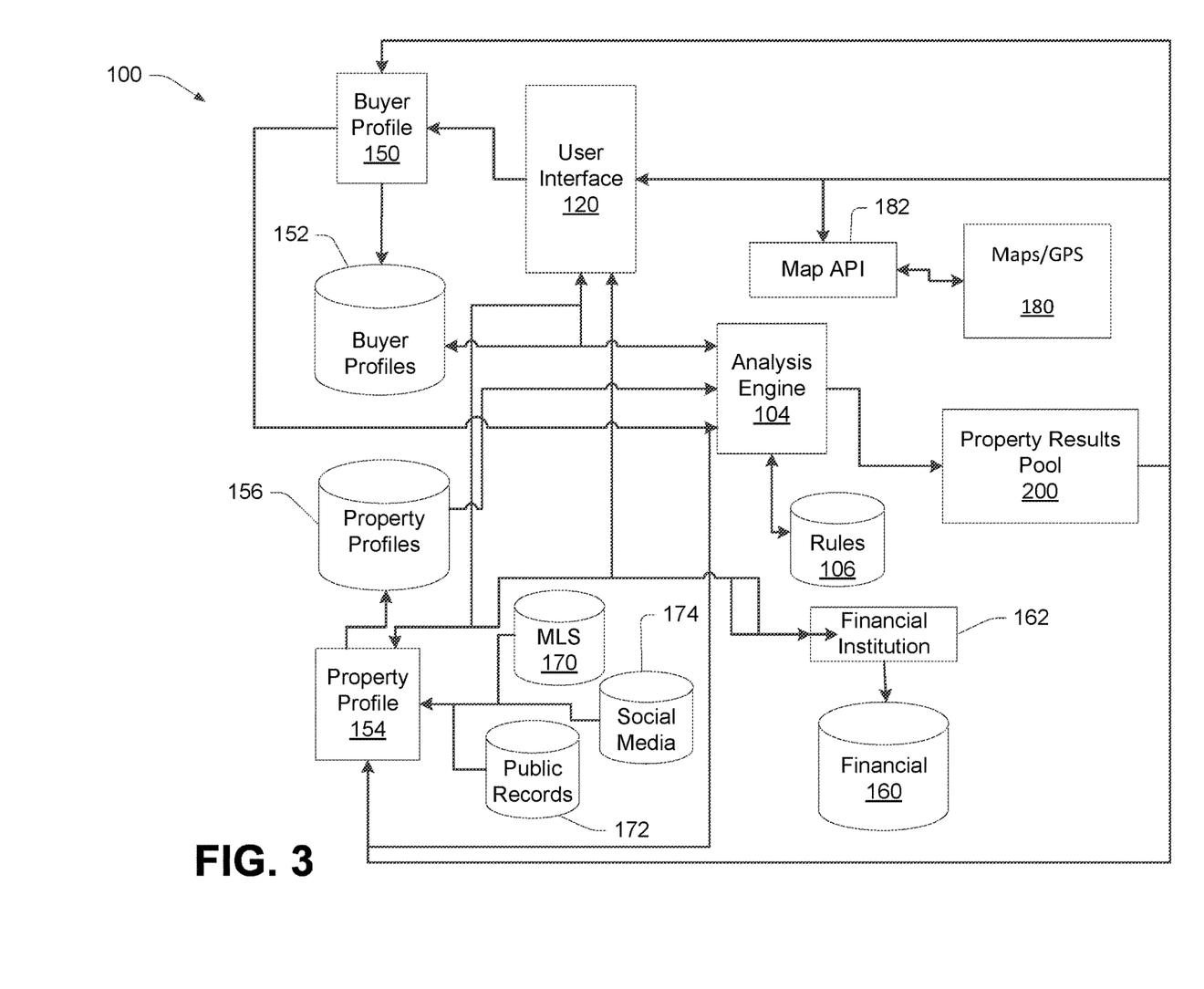
FIG. 3 is block diagram illustrating further aspects of the system shown in FIG. 1.

FIG. 3 is a block diagram illustrating further aspects of examples of the system 100. As noted previously, the analysis engine 110 generates the user interface 120, which may be displayed on any suitable user device 122. A user profile 150 is generated and displayed based on data received from a variety of sources, such as bank data 160 or other financial data from a financial institution. Additionally, the buyer may provide data such as via the user interface 120 for generating the buyer profile. Buyer data could include criteria such as desired location, property features, property price, walkability score, etc. The generated buyer profiles 150 are saved in a buyer profile database 152.

Property profiles 154 include information such as location, features, price, etc., and may be stored in a property profiles database 156. Information used to generate the property profile 154 may come from a variety of sources, including multiple listing services (MLS), public records (tax records, government property records, etc.) and social media websites. Additionally, properties owned or controlled by financial institutions (foreclosures, short sales, etc.) are also considered in some embodiments. Further, properties included in the property profiles 154 are not necessarily limited to for sale properties, but could also include rentals, commercial, investment properties, home sharing (VRBO, AirB&B, etc.), and the like.

The buyer profile 150 and property profile 154 are applied to the rules 106 by the analysis engine 104 to generate a pool of homes 200 that assembles properties based on the buyer profile 150 and property profile 154.

As noted above, the buyer profile 150 is based on various data, including information from the buyer. In the process of finding a home, criteria such as location, price, number of bedrooms, number of bathrooms, home size, etc. are routinely considered. Criteria such as these are easily provided via a questionnaire, for example. However, this can be a tedious task, and there are other criteria that may be more difficult to capture using tools such as checklists.

Figure 4:
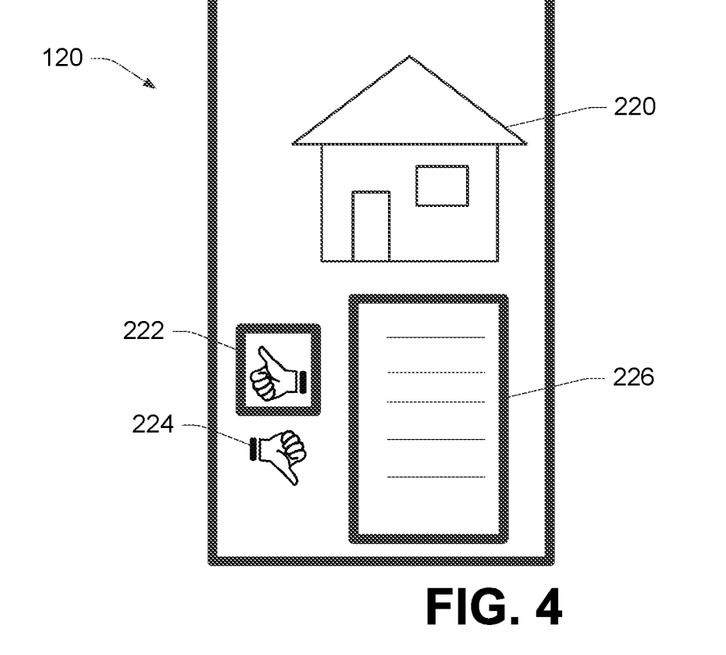
FIG. 4 illustrates an example of a user interface for receiving home information and buyer feedback.

FIG. 4 illustrates an example of an input screen 210 of the user interface 120 that allows a user to provide information and feedback that may be used for creating and modifying the buyer profile 150. When the user interface 120 shown in FIG. 4 is used for receiving buyer criteria, images of properties from the property profile 154 may be displayed, and/or example images of various homes could be displayed. For example, various images of home exteriors 220 could be shown, and the user may then select a simple "yes or no" response, such as the thumbs-up 222 or thumbs-down 224 images. In other examples, the user is prompted to provide a rating of the image, such as a numerical rating, letter grade, etc. The illustrated example further includes an input area 226 for receiving notes from the user or other input.

Figure 5:
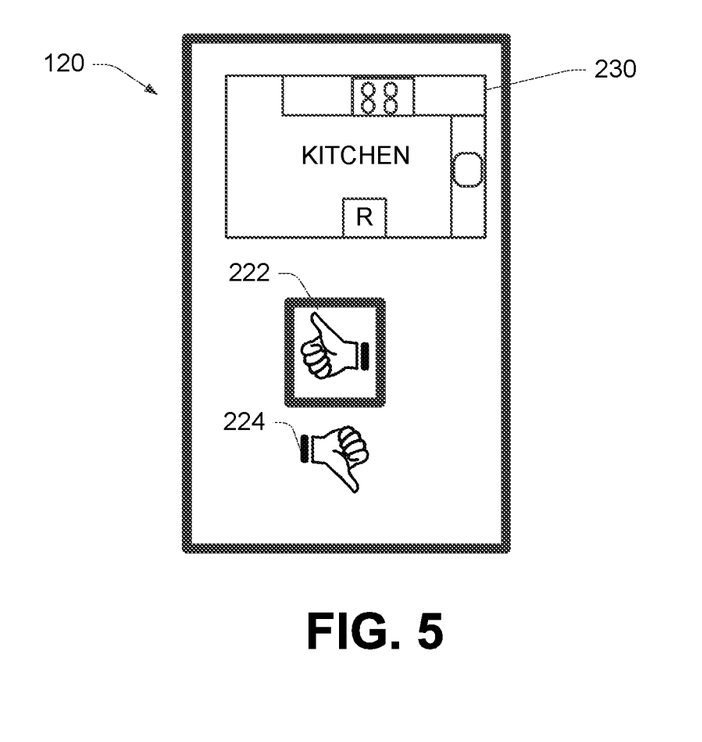
FIG. 5 illustrates an example of another user interface for receiving home information and buyer feedback.

FIG. 5 illustrates another example input screen 212 of the user interface 120, in which other aspects of the properties are displayed. For instance, in FIG. 5, a home kitchen layout image 230 is shown, in response to which the buy may select the thumbs-up 222 or thumbs-down 224 image as desired. Thus, several different kitchen layouts could be displayed and responded to by the buy. This process could then be repeated for other rooms, furnishing styles, bathroom fixtures, etc. such that the analysis engine 104 can "learn" the buyer's preference, and then use this information to assemble the pool of homes 200.

Figure 6:
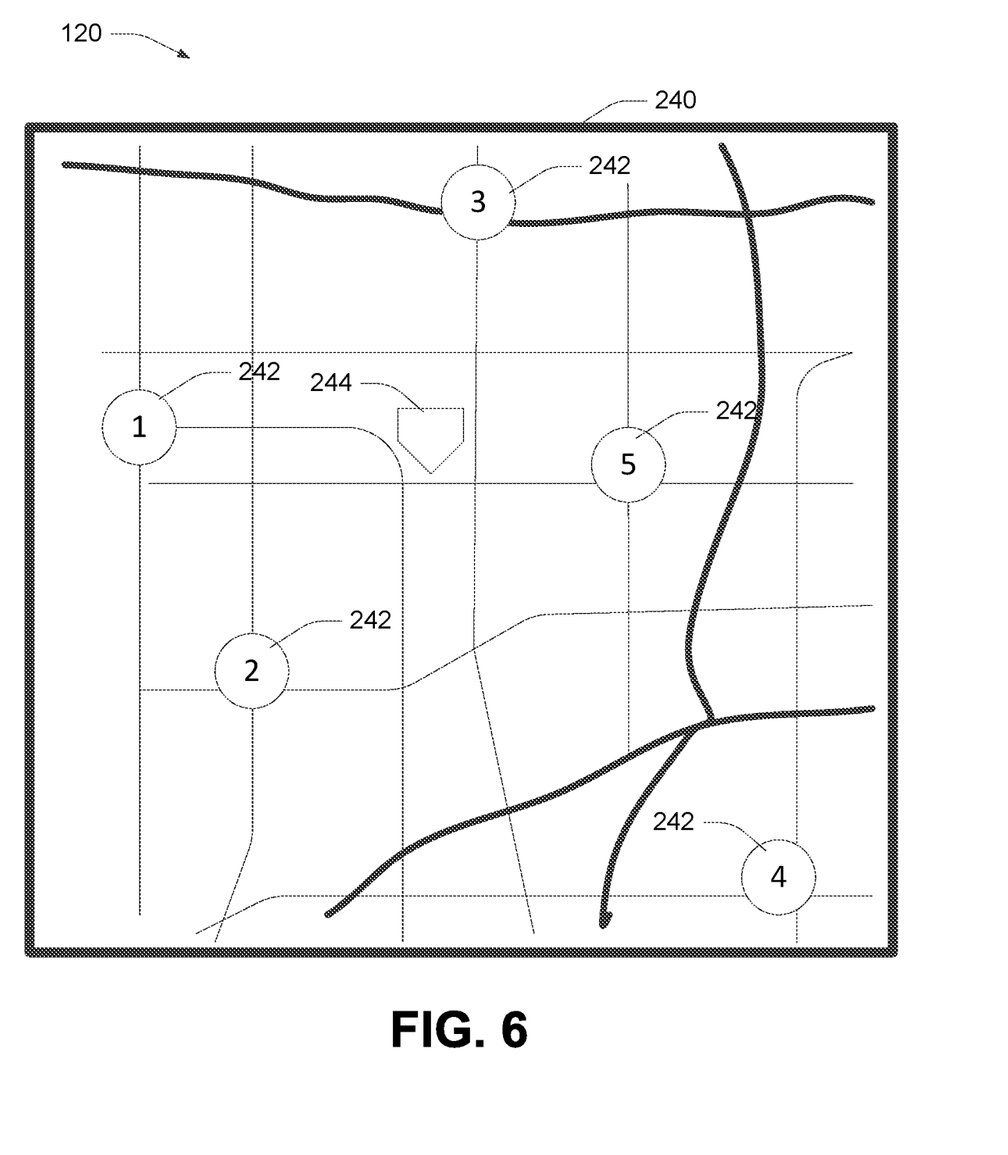
FIG. 6 illustrates an example of a user interface including properties displayed on a map.

Once the pool of homes 200 is assembled, a route is planned for the user to follow when viewing the properties. In the example system shown in FIG. 3, a mapping/GPS application 180, which may interface with the system via a mapping API 182, is used to display the route on the user interface 120 for the buyer. FIG. 6 illustrates an example of a user interface 120 that displays a map 240 with various properties 242 numbered 1-5 identified thereon. The buyer's location 244 may further be shown on the map 240, though the current location of the buyer is not necessarily the start and/or ending point for the displayed route. In some implementations, in addition to determining the route based solely on geographic location of the properties, other factors are considered. For example, if some of the properties 242 have open houses, the time of day could be considered to route the buyer to the open houses while they are open. Still further, the criteria gathered to establish the buyer profile 150 may be analyzed relative to the homes of the home pool 200 to route the buyer to view "best fit" houses first, even if the house is not geographically the closest house. Thus, even though property 5 shown on the map 240 is closer to property 3, it may be a better use of the buyer's available time to travel farther and view property 5 after viewing property 3 if property 5 potentially meets more of a buyer's criteria.

Some implementations further provide dynamic changes to the home pool 200. For example, an alert may be provided via the user interface 120 base on proximity of the user to a new home on market that matches the user profile 150. Alerts may also be provided to the buyer via the user interface when the buyer is in proximity to a property of the pool of homes 200.

Still further, as noted previously with regard to the process shown in FIG. 2, feedback 140 is received at one or more points in the process, and based thereon, the pool of homes and/or route may be modified. Referring again to FIG. 6, the example user interface 120 shows a map 240 with a route displayed for the potential buy to view properties of a pool of properties. The based on the criteria and rules 105, the analysis engine 104 directs the user to home number 1 of the plotted properties 242 shown on the map 240. The user interface may further provide driving directions do direct the buyer to the first house to be viewed.

Figure 7:
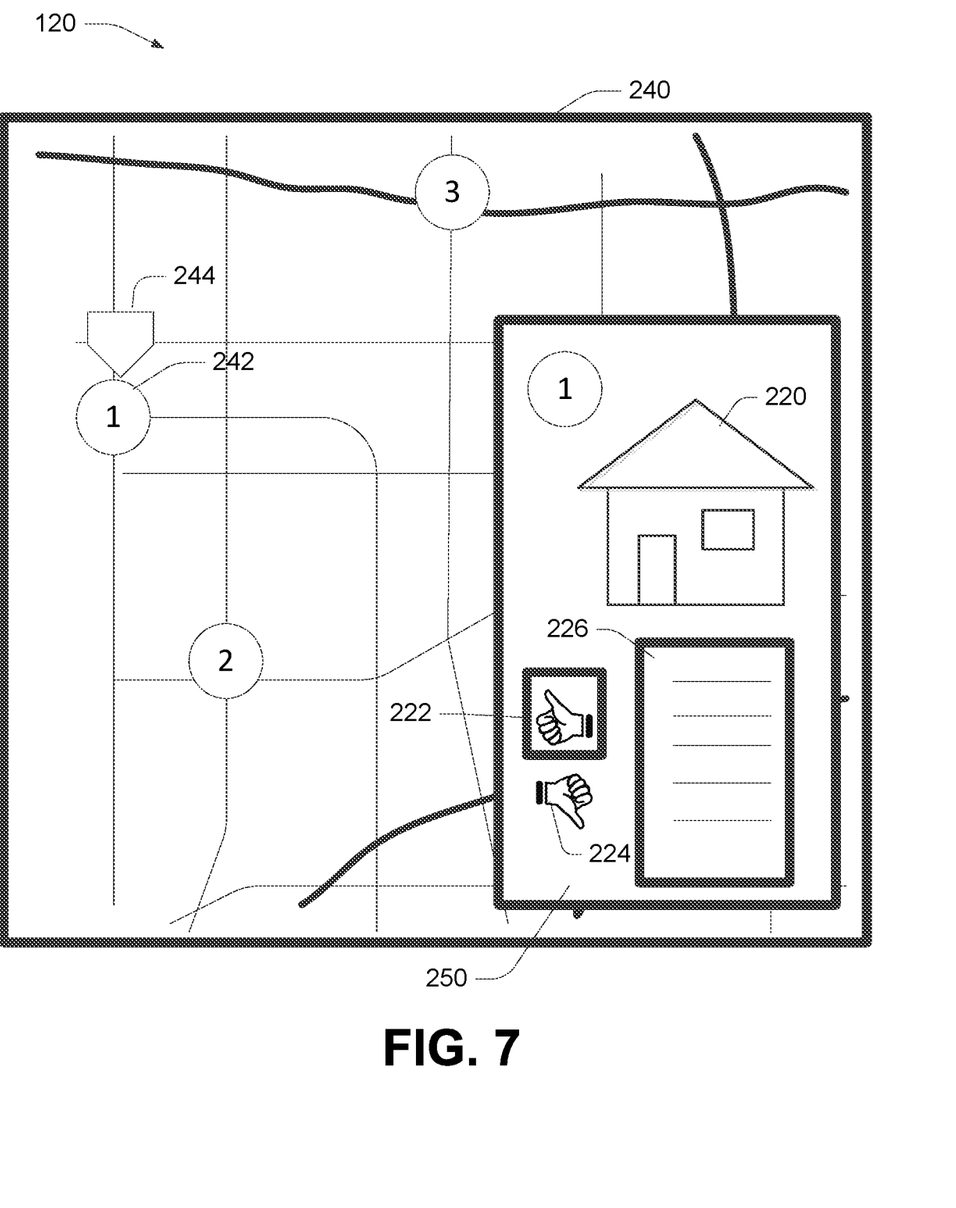
FIG. 7 illustrates the user interface of FIG. 6 with a feedback window.

FIG. 7 shows the user display 120 where the buyer's position 244 is at the first property 242 to be viewed. The user interface shown in FIG. 7 further includes an interface to receive feedback from the buyer regarding home number 1. In the example shown in FIG. 7, the feedback interface is similar to that previously discussed in conjunction with FIGS. 4 and 5. When the user device 122 determines that the buyer's position 244 is at home number 1 (for example, using the GPS application 180), a feedback window 250 is displayed on the user interface 120. The feedback window 250 displays an image of the home 220, and also provides as the thumbs-up 222 or thumbs-down 224 images for the user to provide simple feedback regarding the viewed property. In other examples, additional or other feedback mechanisms may be provided, such as providing a rating of the viewed property (numerical rating, letter grade, etc.). The illustrated example further includes an input area 226 for receiving notes from the user or other input. Further examples provide user interface inputs for the buyer to record other information, such as requesting to be notified whenever the buyer is in a predetermined proximity of the viewed home.

Figure 8:
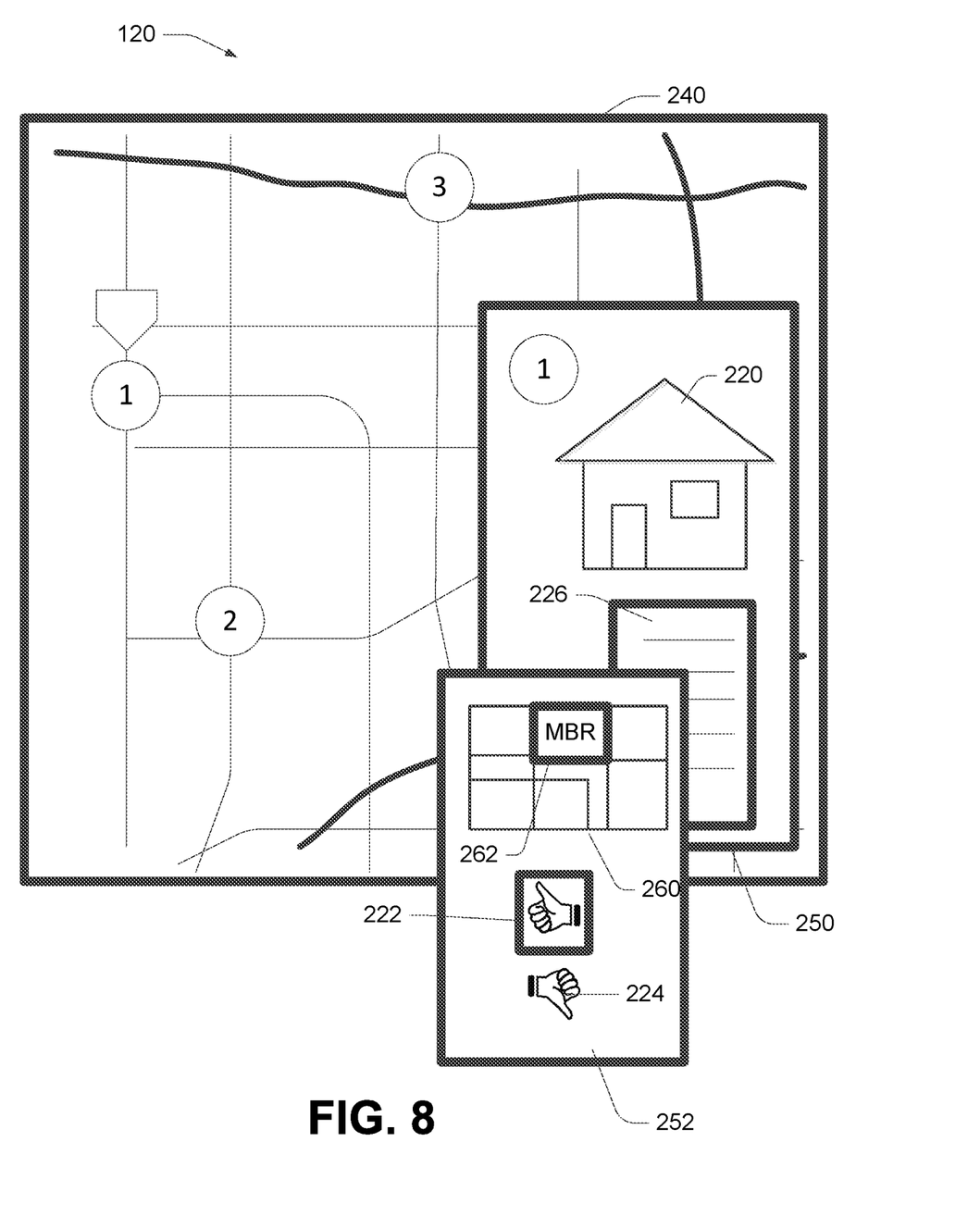
FIG. 8 illustrates the user interface of FIG. 7 with an additional feedback window.

In addition to the first feedback window 250, FIG. 8 illustrates an additional feedback window 252 provided in some examples. The second feedback window 252 receives further feedback regarding other aspects of the viewed property. For instance, the illustrated feedback window 252 displays a floorplan 260 of the viewed property, with the master bedroom 262 highlighted. The user may then provide feedback regarding the master bedroom using the thumbs-up 222 or thumbs-down 224 images. In other examples, one or more images of the master bedroom of the viewed property may be displayed in the feedback window 252. Upon receiving the buyer's feedback regarding the master bedroom 262, the buyer may provide feedback regarding another aspect of the viewed property, such as the master bathroom, kitchen, and so on. In this manner, the user can simply and quickly provide feedback regarding liked and disliked aspects of the viewed home.

Figure 9:
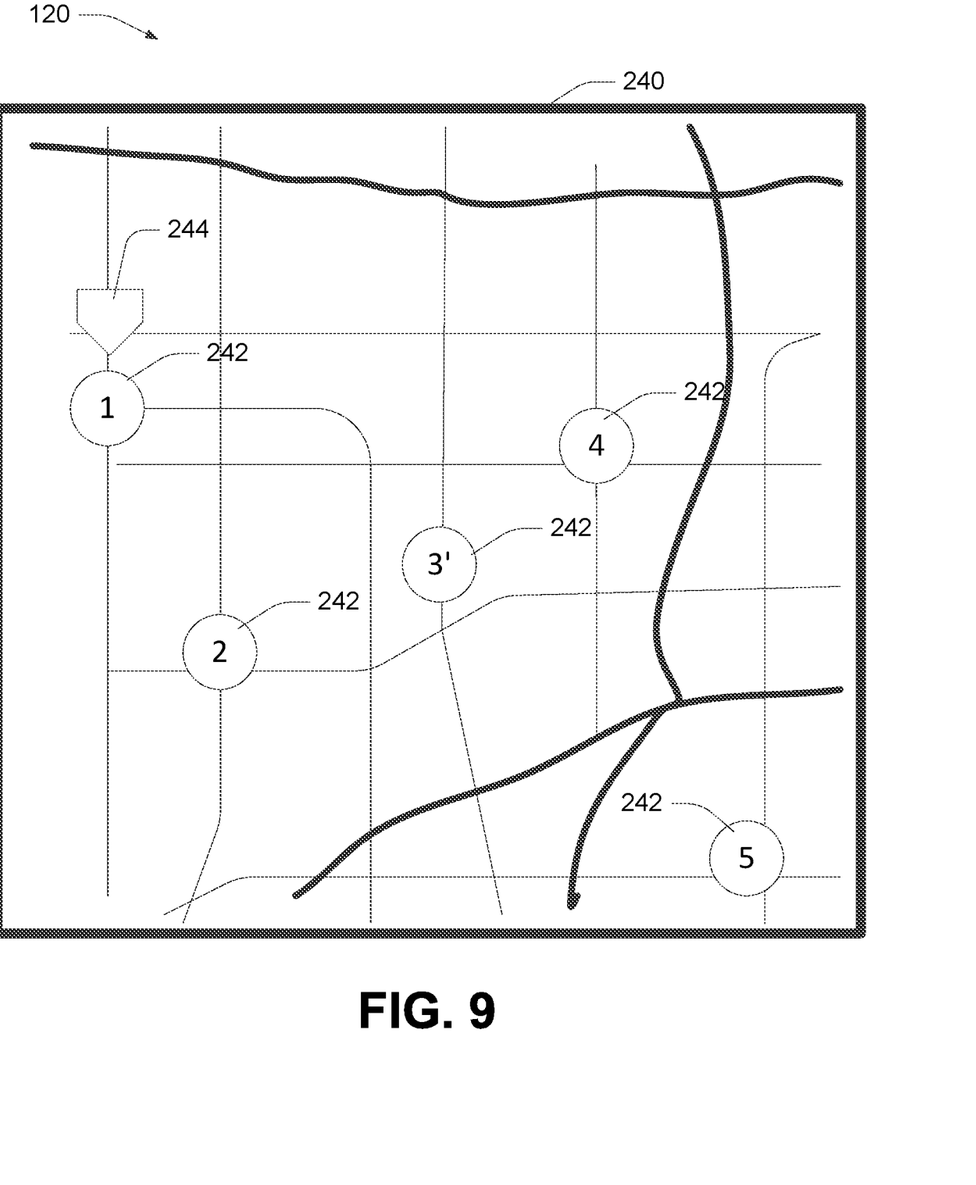
FIG. 9 illustrates the user interface of FIG. 6 with the properties and route modified based on user feedback.

The feedback is received by the analysis engine 104 and applied to the rules 106. Based on the feedback, the property results pool 200 may be modified. Further, the buyer profile 150 may be modified based on the received feedback. For example, if the buyer indicated "thumbs-up" feedback regarding the kitchens some viewed properties, such as properties 1 and 2 shown on the map 240 of the user interface 120 of viewed property number 1, the analysis engine 104 may modify the pool of homes 200 if it determines that another property has a similar kitchen to those receiving "thumbs up" feedback. As shown in FIG. 9, the home number 3 from the map of FIG. 6 has been deleted, and home 3' has been added to the map 240 shown in FIG. 9. Thus, the home pool 200 may be modified in real time based on buyer feedback such that the buyer views the most relevant homes. Moreover, the map 240 of FIG. 9 as reversed the viewing order such that homes 4 and 5 from the map 240 of FIG. 6 have been reversed. Thus, the most relevant homes, based on buyer feedback, are routed for viewing earlier for the buyer.

Some implementations further facilitate the viewing process by interfacing with various calendar or appointment applications. For example, the analysis engine 104 may be configured to find open house dates and times, and/or interface with selling agents for properties of the pool of homes 200 to schedule showings for the potential buyer. Such information could be obtained, for example, through multiple listing service databases 170. In some embodiments, the user interface 120 further provides a bar code that allows the potential buyer to enter the home for viewing.

As noted previously in conjunction with FIG. 3, the analysis engine 104 and rules 106 further may interface with financial institutions (for example, via an API) and financial institution databases 160. Based on user feedback, the financial institution may provide financial information and even prequalify or preapprove the buyer for financing of viewed homes. Further, assumable mortgage recommendations may be provided via the user interface 120, such as in situations where a given financial institution holds the mortgage on a home of the pool of homes 200, or in other situations including assumable mortgages such as with some VA and FHA mortages.

As noted previously, application programming interfaces (API) may be created to allow application developers for financial applications, mapping and GPS applications, social media applications, multiple listing services, etc to connect with the analysis engine 104 to directly provide information. Such APIs may also allow application developers for other information sources discussed further below to provide information to the buyer based on buyer feedback.

Figure 10:
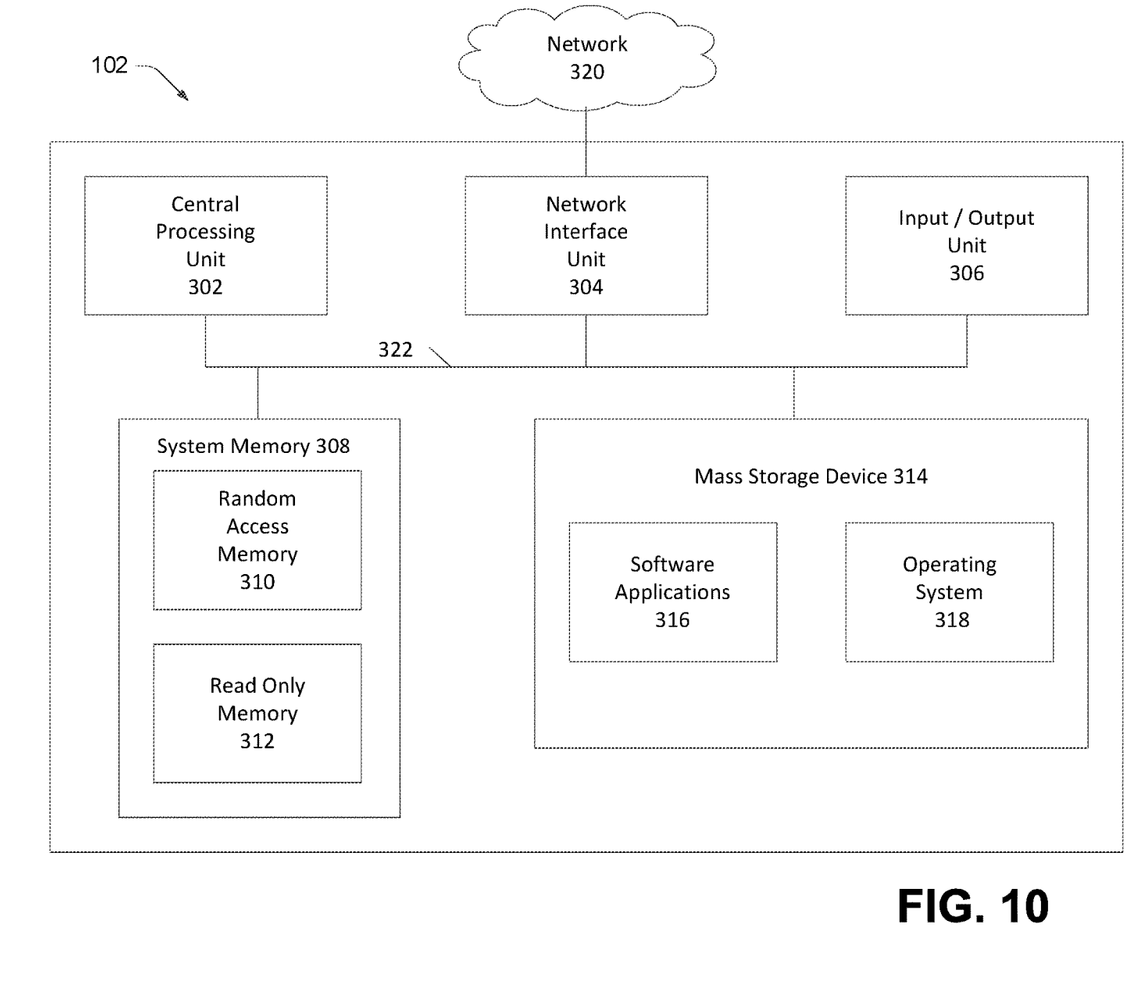
FIG. 10 a block diagram illustrating portions of an example computer system.

FIG. 10 schematically illustrates an example of the computer 102, which could be a server computer at a financial institution. The computer 102 includes at least one processor ("CPU") 302, a system memory 308, and a system bus 322 that couples the system memory 308 to the CPU 302. The system memory 308 includes a random access memory ("RAM") 310 and a read-only memory ("ROM") 312. A basic input/output system that contains the basic routines that help to transfer information between elements within the server computer 102, such as during startup, is stored in the ROM 312. The server computer 102 further includes a mass storage device 314. The mass storage device 314 is able to store software instructions and data. As noted above, the database 110 could be implemented by the mass storage device 312, and could further include additional databases implemented by other computer systems accessible by the server 102. A processor, system memory and mass storage device similar to that in FIG. 10 are also included in each of the devices 122 providing the user interfaces 120.

The mass storage device 314 is connected to the CPU 302 through a mass storage controller (not shown) connected to the system bus 322. The mass storage device 314 and its associated computer-readable data storage media provide non-volatile, non-transitory storage for the server computer 102. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the server computer 102.

According to various embodiments of the invention, the server computer 102 may operate in a networked environment using logical connections to remote network devices through the network 320, such as a wireless network, the Internet, or another type of network. The server computer 102 may connect to the network 320 through a network interface unit 304 connected to the system bus 322. It should be appreciated that the network interface unit 304 may also be utilized to connect to other types of networks and remote computing systems. The server computer 102 also includes an input/output controller 306 for receiving and processing input from a number of other devices, including a touch user interface display screen, or another type of input device. Similarly, the input/output controller 306 may provide output to a touch user interface display screen or other type of output device.

As mentioned briefly above, the mass storage device 314 and the RAM 310 of the server computer 102 can store software instructions and data. The software instructions include an operating system 318 suitable for controlling the operation of the server computer 102. The mass storage device 314 and/or the RAM 310 also store software instructions, that when executed by the CPU 302, cause the server computer 102 to provide the functionality of the server computer 102 discussed in this document. For example, the mass storage device 314 and/or the RAM 310 can store software instructions that, when executed by the CPU 302, cause the server computer 102 to implement the analysis engine 104 and the rules engine 106 shown in FIG. 1 for applying the various processes described herein, among other things.

Although various embodiments are described herein, those of ordinary skill in the art will understand that many modifications may be made thereto within the scope of the present disclosure. For instance, examples related to home loans are included herein, though the disclosed systems and methods are also applicable to many other financial processes, such as personal and business loans, credit card accounts, home equity lines of credit, mortgage refinances, etc. Accordingly, it is not intended that the scope of the disclosure in any way be limited by the examples provided.

What is claimed is:

1. A system, comprising:
   a processor;
   a user electronic device including a global positioning device and an interactive graphical display;
   a memory accessible by the processor storing program instructions that configure the processor to:
   receive first data regarding home criteria;
   assemble a first pool of homes based on the first data, the first pool of homes including a plurality of properties;
   display the first pool of homes on the interactive graphical display;
   determine a first route for viewing the properties of the first pool of homes;
   display the first route using the interactive graphical display;
   detect, using the global positioning device, a location of the user electronic device at a first home of the first pool of homes, causing the interactive graphical display of the user electronic device to display a first user interface, including:
   (i) a map, a plurality of properties being identified on the map, the plurality of properties including the first home;
   (ii) the location of the user electronic device on the map; and
   (iii) a first feedback window overlaying a portion of the map, the first feedback window showing an image of an exterior of the first home and selectable first feedback images;
   in response to a selection, using the interactive graphical display, of one of the selectable first feedback images, display, using the interactive graphical display, a second user interface, including:
   (i) the map;
   (ii) at least a portion of the first feedback window overlaying a portion of the map; and
   (iii) a second feedback window overlaying a portion of the first feedback window, the second feedback window including an image showing a floorplan of the first home, the image including a highlighted portion of the floorplan, the second feedback window also including selectable second feedback images; and
   modify the first pool of homes based on the selection of one of the selectable first feedback images and a selection, using the interactive graphical display, of one of the selectable second feedback images to generate a modified pool of homes;
   generate a second route for viewing the modified pool of homes, the second route including a viewing order of the modified pool of homes and being different from the first route; and
   display the second route using the interactive graphical display.

2. The system of claim 1, wherein receiving the first data includes receiving information from a potential buyer via the interactive graphical display.

3. The system of claim 1, wherein receiving the first data includes accessing a financial institution database storing financial information regarding a potential buyer.

4. The system of claim 3, wherein receiving the first data includes receiving a loan preapproval amount for the potential buyer.

5. The system of claim 3, wherein receiving the first data includes receiving information regarding foreclosure properties owned by the financial institution.

6. The system of claim 1, wherein receiving the first data includes accessing a home listing database storing information regarding available properties.

7. The system of claim 1, wherein determining the first route for viewing includes applying the first data to predetermined rules.

8. The system of claim 1, further comprising generating an alert for display via the interactive graphical display in response to modifying the first pool of homes.

9. A computer implemented method, comprising:
   receiving first data regarding home criteria;
   assembling a first pool of homes based on the first data, the first pool of homes including a plurality of properties;

displaying the first pool of homes on an interactive graphical display;

determining a first route for viewing the first pool of homes;

displaying the first route using the interactive graphical display;

detecting, using a global positioning device, a location of a user electronic device at a first home of the first pool of homes;

displaying, using the interactive graphical display, a first user interface, including:
  (i) a map, a plurality of properties being identified on the map, the plurality of properties including the first home;
  (ii) the location of the user electronic device on the map; and
  (iii) a first feedback window overlaying a portion of the map, the first feedback window showing a first image of an exterior of the first home and selectable first feedback images;

in response to a first feedback, the first feedback being a selection, using the interactive graphical display, of one of the selectable first feedback images, displaying, using the interactive graphical display, a second user interface, including:
  (i) the map;
  (ii) at least a portion of the first feedback window overlaying a portion of the map; and
  (iii) a second feedback window overlaying a portion of the first feedback window, the second feedback window including a second image showing a floorplan of the first home of the first pool of homes, the second image including a first highlighted portion of the floorplan, the second feedback window also including selectable second feedback images;

receiving, using the interactive graphical display, second feedback regarding the first highlighted portion, the second feedback including a selection of a second one of the selectable second feedback images displayed using the interactive graphical display that indicates a like or a dislike of the first highlighted portion;

displaying, using the interactive graphical display, a third image showing the floorplan and including a second highlighted portion of the floorplan;

receiving, using the interactive graphical display, third feedback regarding the second highlighted portion, the third feedback including selection of a fourth image displayed using the interactive graphical display that indicates a like or a dislike of the second highlighted portion;

modifying the first pool of homes based on the first feedback and the second feedback to generate a modified pool of homes;

generating a second route for viewing the modified pool of homes, the second route including a viewing order of the modified pool of homes and being different from the first route; and displaying the second route using the interactive graphical display, wherein receipt of the first feedback, the second feedback, and the third feedback using the interactive graphical display causes the interactive graphical display to display the second route.

10. A non-transitory computer-readable data storage medium storing instructions that, when executed by a computing system, implement a method comprising:

receiving first data regarding home criteria;

assembling a first pool of homes based on the first data, the first pool of homes including a plurality of properties;

displaying the first pool of homes on an interactive graphical display;

determining a first route for viewing the first pool of homes;

displaying the first route using the interactive graphical display;

detecting, using a global positioning device, a location of a user electronic device at a first home of the first pool of homes, causing:

displaying, using the interactive graphical display, a first user interface, including:
  (i) a map, a plurality of properties being identified on the map, the plurality of properties including the first home;
  (ii) the location of the user electronic device on the map; and
  (iii) a first feedback window overlaying a portion of the map, the first feedback window showing an image of an exterior of the first home and selectable first feedback images;

in response to a selection, using the interactive graphical display, of one of the selectable first feedback images, displaying, using the interactive graphical display, a second user interface, including:
  (i) the map;
  (ii) at least a portion of the first feedback window overlaying a portion of the map; and
  (iii) a second feedback window overlaying a portion of the first feedback window, the second feedback window including an image showing a floorplan of the first home of the first pool of homes, the image including a highlighted portion of the floorplan;

modifying the first pool of homes based on the selection of one of the selectable first feedback images and a selection, using the interactive graphical display, of one of the selectable second feedback images to provide a modified pool of homes;

generating a second route for viewing the modified pool of homes, the second route including a viewing order of the modified pool of homes and being different from the first route; and displaying the second route using the interactive graphical display.

* * * * *

UNITED STATES PATENT AND TRADEMARK OFFICE
CERTIFICATE OF CORRECTION

PATENT NO. : 10,915,976 B1
APPLICATION NO. : 15/351938
DATED : February 9, 2021
INVENTOR(S) : Park et al.

Page 1 of 1

It is certified that error appears in the above-identified patent and that said Letters Patent is hereby corrected as shown below:

In the Claims

Column 9, Line 38, Claim 9: after "selection of" delete "a second"

Signed and Sealed this
First Day of June, 2021

Drew Hirshfeld
*Performing the Functions and Duties of the*
*Under Secretary of Commerce for Intellectual Property and*
*Director of the United States Patent and Trademark Office*